(12) United States Patent
Wang et al.

(10) Patent No.: US 7,701,169 B2
(45) Date of Patent: Apr. 20, 2010

(54) LITHIUM SECONDARY BATTERY HAVING INTERNAL PROTECTION CIRCUIT

(75) Inventors: Chuanfu Wang, Shenzhen (CN); Yueqing Yan, Shenzhen (CN); Haishan Yang, Shenzhen (CN)

(73) Assignee: BYD Company Limited, Shenzhen, Guangdong (CN)

( * ) Notice: Subject to any disclaimer, the term of this patent is extended or adjusted under 35 U.S.C. 154(b) by 1368 days.

(21) Appl. No.: 10/504,070

(22) PCT Filed: Nov. 7, 2002

(86) PCT No.: PCT/CN02/00793
§ 371 (c)(1),
(2), (4) Date: May 11, 2005

(87) PCT Pub. No.: WO03/067700
PCT Pub. Date: Aug. 14, 2003

(65) Prior Publication Data
US 2008/0254344 A1    Oct. 16, 2008

(30) Foreign Application Priority Data
Feb. 4, 2002 (CN) .............................. 02 2 25529 U

(51) Int. Cl.
*H02J 7/00* (2006.01)
*H01M 2/00* (2006.01)
(52) U.S. Cl. ........................................ 320/112; 429/61
(58) Field of Classification Search ................. 320/107, 320/112, 134; 429/61, 90, 91, 126, 150, 429/208
See application file for complete search history.

(56) References Cited

U.S. PATENT DOCUMENTS

| | | | | |
|---|---|---|---|---|
| 6,140,927 A | * | 10/2000 | Whitmire | 340/636.15 |
| 6,184,658 B1 | * | 2/2001 | Mori et al. | 320/134 |
| 6,225,778 B1 | * | 5/2001 | Hayama et al. | 320/112 |
| 6,313,610 B1 | | 11/2001 | Korsunsky | |
| 6,492,058 B1 | * | 12/2002 | Watanabe et al. | 429/121 |
| 2002/0117994 A1 | * | 8/2002 | Chien et al. | 320/107 |
| 2003/0190499 A1 | * | 10/2003 | Watanabe et al. | 429/7 |

FOREIGN PATENT DOCUMENTS

| | | |
|---|---|---|
| CN | 1177217 A | 3/1998 |
| CN | 1197534 A | 10/1998 |
| CN | 1305238 A | 7/2001 |
| CN | 1318211 A | 10/2001 |
| CN | 01235497 X | 1/2002 |
| CN | 2469561 Y | 1/2002 |

* cited by examiner

*Primary Examiner*—Patrick J Assouad
*Assistant Examiner*—Richard V Muralidar
(74) *Attorney, Agent, or Firm*—Blakely, Sokoloff, Taylor & Zafman LLP

(57) ABSTRACT

The present invention relates to a lithium secondary battery with a built-in protective circuit, which includes battery case (1), a battery core (2) and electrolyte. According to the present invention, a built-in protective circuit module (4) is provided to act as the connection between terminals of positive and negative electrodes (21 and 22) and output ends of positive and negative electrodes (31 and 32) inside the battery. The battery of the present invention has the advantages of safe and reliable protection against short-circuit, over-charge, over-discharge and over-current in the application, and therefore it is reliable power supply for the portable electronic appliances such as mobile phones and the like.

7 Claims, 2 Drawing Sheets

LITHIUM SECONDARY BATTERY HAVING INTERNAL PROTECTION CIRCUIT

CROSS-REFERENCE TO OTHER APPLICATIONS

This Application is a National Phase of International Application No. PCT/CN02/00793, filed on Nov. 7, 2002, which claims priority from Chinese Patent Application No. 02225529.X, filed on Feb. 4, 2002.

TECHNICAL FIELD OF THE INVENTION

The present invention relates to a lithium secondary battery, in particular, it relates to a lithium secondary battery with a built-in protective circuit in the battery cavity.

BACKGROUND OF THE INVENTION

In mobile phones, portable computers and other portable electronic products a lithium secondary battery is usually used as power supply to replace alkaline secondary batteries such as nickel-hydrogen and nickel-cadmium secondary batteries. When short-circuit occurs in the circuit outside the battery, a large short-circuit current will pass through the battery, which may cause the battery to become hot and scalding to the touch and even may cause an explosion. In order to avoid the above-mentioned dangers, the current should be cut off when short-circuit happens in batteries. The prior art discloses some methods for this purpose. For example, the Chinese Patent Application No. CN1197534A discloses a battery utilizing a positive temperature coefficient (PTC) element. The resistance of the PTC element is small during the normal charge. In case the battery is short-circuited, a large current will pass through the PTC element and the temperature of the PTC element will rise drastically in a short time, and its resistance will rise all of sudden when its temperature rises to a certain value and therefore the circuit is close to the status of being broken off. After the temperature of the PTC element drops, its resistance will goes back to its normal low level, and the circuit will become conductive once again. By adopting this kind of PTC element, the battery can be cut off promptly from the short-circuited loop. Besides, the PTC element is resistant to the impact of short-circuit current many times. The Chinese Patent Application No. CN1177217A discloses a battery, which has a protective circuit to prevent the damage caused by the external short-circuit. This protective circuit may detect the status of the battery. When the battery is cut off from the electronic device to which it is connected, the protective circuit will detect the breakaway of the external circuit and therefore will cut off the connection with the external power to avoid the short-circuit. By utilizing this kind of protective circuit, short-circuit of the battery caused by short-circuit of external powers can be fully avoided. The Chinese Patent No. ZL01235497X discloses an alkaline secondary battery having the function of short-circuit protection. In this kind of batteries, the conducting terminal of the electrode is made of nickel, tin, copper or lead. A default portion, such as a narrow neck, pore, mesh or the combination thereof is provided on the conducting terminal. The terminal will be burnt off within 0~2 seconds when a short-circuit current larger than 30 A passes through it, thus the dangers, such as overheat, explosion and electrolyte leakage caused by a long-term short-circuit of batteries can be avoided.

The research of the inventors of the present invention has revealed that the above techniques disclosed in the above patent applications and patent are applied mainly to nickel-cadmium battery and nickel-hydrogen battery used in electric toys and tools, and they show the following disadvantages when they are applied to lithium secondary batteries: (1) the reliability of the safety protection will be decreased because the protection is realized by utilizing the physical properties of materials as used; (2) the protection device occupies a definite external space, and therefore the corresponding battery capacity will be reduced in relation to the battery with the same size.

DISCLOSURE OF THE INVENTION

The object of the present invention is to overcome the defects mentioned above to provide a lithium secondary battery with a built-in protective circuit whose structure is simple and whose safety protection function is reliable.

The present invention provides a lithium secondary battery with a built-in protective circuit, which includes a battery case (1), a battery core (2) consisting of a positive electrode plate, a separator, and a negative electrode plate, which are overlapped one by one, and electrolyte, characterized in that: a built-in protective circuit module (4) is provided in the connection of terminals of positive and negative electrodes (21 and 22) with output ends of positive and negative electrodes (31 and 32) inside the battery cavity. The module (4) can detect and control the over-charge, over-discharge and over-current of the battery.

Preferably, the module (4) includes an integrated circuit (IC) and a field-effect transistor (FET) and is manufactured by COB (Chip On Board) technique. More preferably, the module (4) has three feet connected with the terminals of positive and negative electrodes (21, 22) and the output end of positive and negative electrodes (31, 32) respectively. Most preferably, the positive power input (VDD) end of the integrated circuit in the module (4) acts as a foot (411) which connects with the terminal of the positive electrode (21) and the output end of the positive electrode (31), the negative power input (VSS) end of the integrated circuit in the module (4) acts as a foot (421) which connects with the terminal of the negative electrode (22), and the FET gate control pin for discharge (DO) or FET gate control pin for charge (CO) end is connected with the FET and is led out from the FET acting as a foot (421) which connects with the output end of the negative electrode (32).

Alternatively, the VDD end of the integrated circuit in the module (4) acts as a foot (411), which connects with the terminal of the negative electrode (22) and the output end of the negative electrode (32); the VSS end of the integrated circuit in the module (4) acts as a foot (412), which connects with the terminal of the positive electrode (21) and connects with FET, and the DO or CO end is connected with FET and is led out from FET acting as a foot (421) which connects with the output end of the positive electrode (31).

The positive electrode contains lithium-containing materials, which can be intercalated or de-intercalated reversibly by lithium ions, such as lithium-cobalt oxide, lithium-nickel oxide, lithium-manganese oxide and the like. The negative electrode contains carbon materials, which can be intercalated or de-intercalated reversible by lithium ions, such as natural graphite, artificial graphite, cork and the like. The electrolyte is non-aqueous, solid or gel electrolytes.

The protective circuit module is encased by a material resistant to the corrosion of electrolyte so that it is isolated from the electrolyte.

The lithium secondary battery of the present invention can be in the shape of cylinder, cube or sheet.

The common lithium secondary battery in the prior art is not equipped with a built-in protective circuit module, whereas the lithium secondary battery of the present invention provides with a protective circuit module inserted inside the battery core. Comparing with the prior art, the battery of the present invention has the following advantages:

Higher Safety Reliability

The lithium secondary battery in the prior art exists some potential safety problems when the positive electrode and negative electrode thereof are short-circuited or when the battery is over-charged. In addition, the performance of the battery in the prior art is affected by over-discharge and over-current. Comparing with the battery of the prior art, the lithium secondary battery of the present invention is protected against the dangers relating to short-circuit of positive and negative electrodes, over-charge, over-discharge and over-current, and therefore its safety and reliability have been enhanced greatly.

Enhanced Battery Capacity

Nowadays the size of the battery used in mobile phones becomes smaller and smaller. Because of the lithium battery characteristics, each battery must be equipped with a protective circuit board, which occupies a definite space of the battery resulting in the loss of battery capacity. Comparing with the battery of the prior art, the safe and intelligent lithium secondary battery of the present invention is equipped with a protective circuit module manufactured by COB (Chip On Board) technique. The size of the module is small, and its shape can be designed in compliance with the battery shell and the internal structure. In addition, the module acts as the connection inside the battery, therefore the module only occupies a small space resulting in the increase of battery volume and capacity in relation to the battery with the same size of the prior art.

BEST MODES FOR CARRYING OUT THE INVENTION

In the following, the best modes for carrying out the present invention will be illustrated by referring to the accompanying drawings.

The battery with a size of 48×30×5(mm) was used as an example. The electrodes of the battery were manufactured by adopting the conventional method.

1. The Manufacture of Positive Electrode Plate

83% by weight of lithium-cobalt oxide ($LiCoO_2$) as the active substance, 8% by weight of acetylene black as the conducting agent, 4% by weight of polyvinylidene fluoride (PVdF) as the binder, and 5% by weight of N-methyl-pyrrolidone (NMP) as the solvent were mixed to make a paste. The obtained paste was coated on an aluminum foil used as a collector. Then the coated foil was heated to evaporate the surplus solvent and then was pressed by a roller to a definite thickness. Finally, the pressed foil was cut into a desired rectangular or strip-type electrode plate.

2. The Manufacture of Negative Electrode Plate

90% by weight of natural graphite as the carbon material and 5% by weight of PVdF as the binder were mixed to obtain a mixture thereof. The obtained mixture was added to 5% by weight of NMP as the solvent and stirred to obtain a uniform paste. The obtained paste was coated on a copper foil used as a collector. Then the coated foil was heated to evaporate the surplus solvent and then was pressed by a roller to a definite thickness. Finally, the pressed foil was cut into rectangular or strip-like negative electrode plate, which matched with the shape of the electrode plate obtained in the above step.

The positive and negative electrode plates were welded with conducting terminals respectively, and then were over-lapped with a separator one by one to obtain a battery core.

Figure 1:
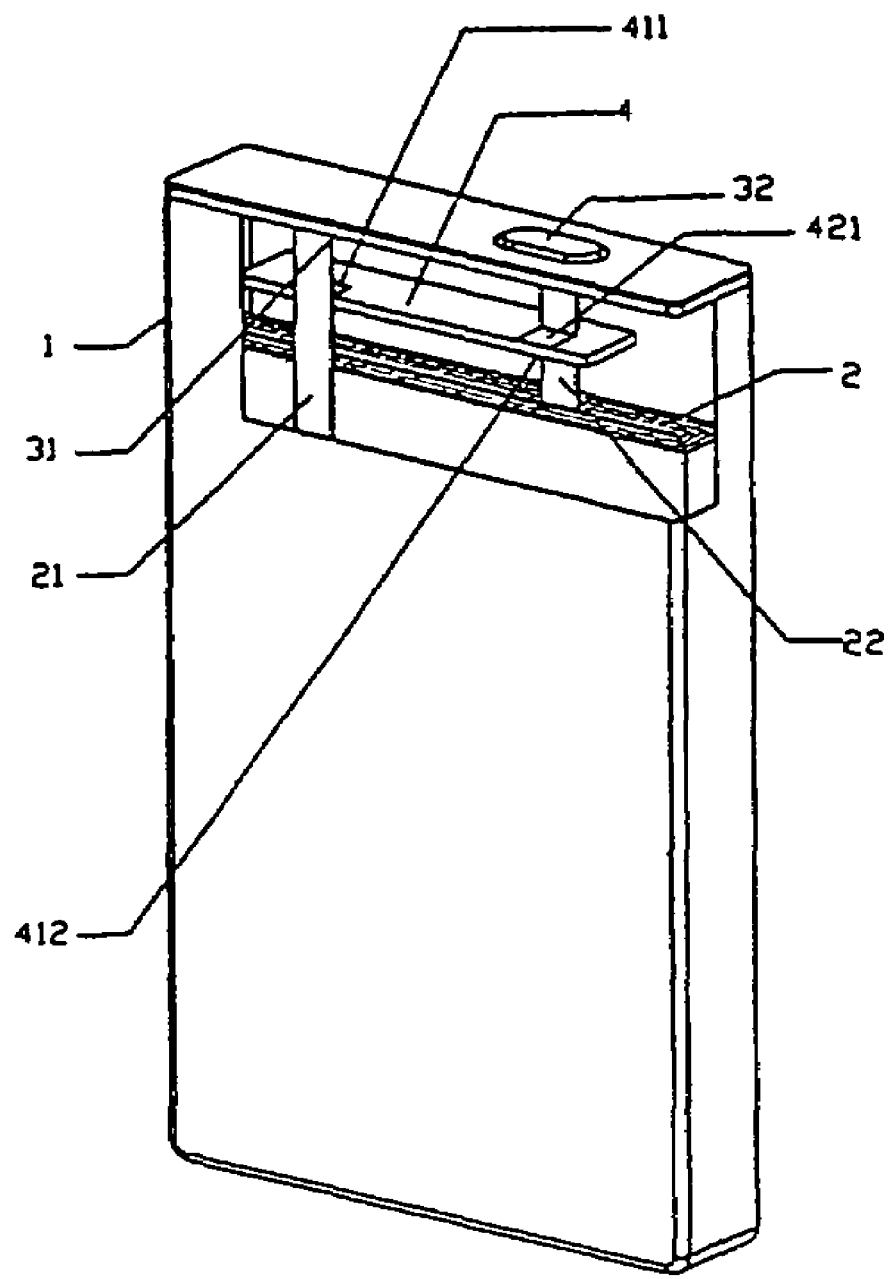
FIG. 1 is the diagram of the internal structure of the lithium secondary battery with a built-in protective circuit of the present invention.

As shown in FIG. 1, a battery case 1 was welded onto a covering plate (not shown in the figure) being the output end of positive electrode 31; a covering cap separated from the covering plate by polystyrene acted as the output end of negative electrode 32. On the integrated circuit (not shown in the figure) in protective circuit module 4, VDD end acted as foot 411 which connected with the terminal of positive electrode 21 led out from core 2 and with the output end of positive electrode 31; VSS end acted as foot 412 which connected with the terminal of negative electrode 22 led out from core 2; DO or CO end was connected with FET (not shown in the figure) and was led out from FET and acted as foot 421 which connected with the output end of negative electrode 32.

Preferably, a sheet or wire made of nickel, copper or aluminum was selected for the manufacture of terminals of positive and negative electrodes and foot 411, 412 and 421.

Figure 2:
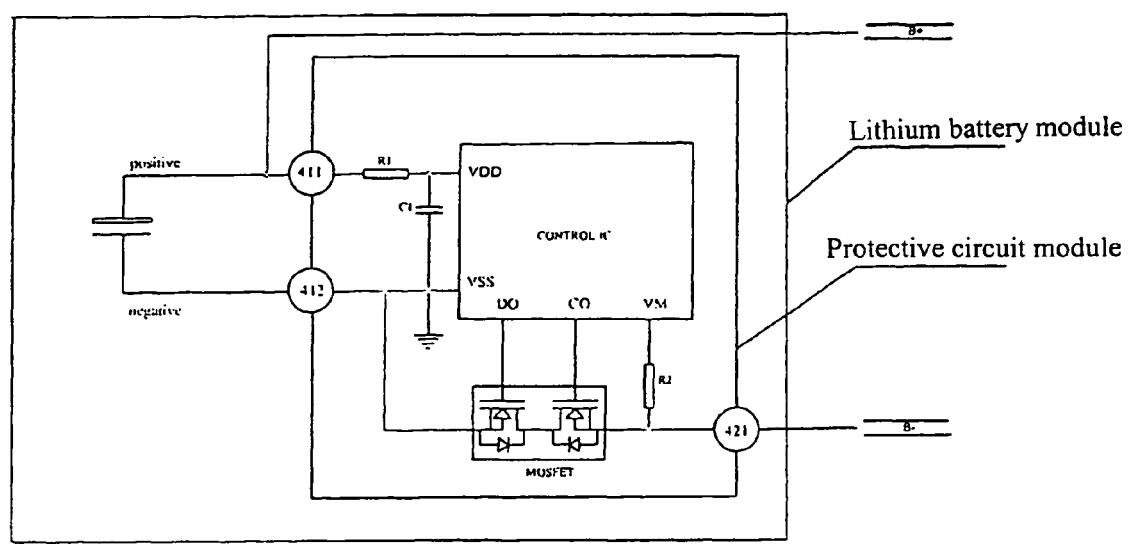
FIG. 2 is the diagram of the working principle of the lithium secondary battery with a built-in protective circuit of the present invention.

As shown in FIG. 2, the integrated circuit (also called control IC in the figure) had the functions of detection and control, and FET (also called MOSFET in the figure) acted as a switch. VDD end of control IC acted as foot 411, which connected with the terminal of positive electrode 21 (also called positive in the figure) and with the output end of positive electrode 31 (also called $B_+$ in the figure). VSS end acted as foot 412, which connected with the terminal of negative electrode 22 (also called negative in the figure). In case control IC had detected a battery voltage higher than the test voltage of over-charge or smaller than the test voltage of over-discharge, control IC would send the low-level signal to CO or DO end for controlling MOSFET, and then MOSFET would break the connection between negative and the output end of negative electrode 32 (also called B− in the figure), and therefore the protection against over-charge and over-discharge could be realized. Besides, the protective circuit also had the function of protecting against over-current and short-circuit. When the battery was discharged under a too large current, a voltage drop would form between negative and B−, and the voltage drop would drive MOSFET to break the connection between negative and B− when it had been detected by control IC.

The circuit protection module of the present invention is manufactured by COB (Chip On Board) technique. The size of the module is smaller, and its shape can be designed in compliance with the battery case and the internal structure. In addition, the module can act as the connection inside the battery. Therefore, the module only occupies a smaller space, resulting in the increase of battery volume and capacity in relation to the battery with the same size. Besides, the module offers the protection against short-circuit between positive and negative electrodes, over-charge, over-discharge and over-current, and therefore safety and reliability of the battery utilizing the module is enhanced greatly.

The invention claimed is:

1. A lithium secondary battery with a built-in protective circuit, comprising:
    a battery case (1); and
    a battery core (2) including a positive electrode plate, a separator and a negative electrode sheet being overlapped one by one, electrolyte, and a built-in protective circuit module (4) to act as an internal connection to the terminals of positive and negative electrodes and to detect and control the over-charge, over-discharge and over-current of the battery, wherein
    the protective circuit module (4) includes an integrated circuit ("IC") and a field effect transistor ("FET"), and
    the lithium secondary battery with a built-in protective circuit has three feet (411), (412) and (421) which are connected with a terminal and the output end of one electrode, a terminal and output end of another electrode of the battery respectively, and the FET is electrically connected with feet (412), (421) and the integrated circuit.

2. The lithium secondary battery according to claim 1, characterized in that the protective circuit module (4) is manufactured by chip on board ("COB") technique.

3. The lithium secondary battery according to claim 1, wherein a positive power input ("VDD") end on the IC of the protective circuit module (4) acts as foot (411), which connects with the terminal of the positive electrode (21) and the output end of the positive electrode (31); a negative power input ("VSS") end acts as foot (412), which connects with the terminal of negative electrode (22) and the FET; and a FET gate control pin for discharge ("DO") or FET gate control pin for charge ("CO") is connected with the FET and the negative power input is led out through the FET and acts as foot (421), which connects with the output end of negative electrode (32).

4. The lithium secondary battery according to claim 1, characterized in that, the VDD end on the IC of the protective circuit module (4) acts as foot (411), which connects with the terminal of negative electrode (22) and the output end of negative electrode (32); the VSS end acts as foot (412), which connects with the terminal of positive electrode (21) and the FET; the DO or CO end is connected with the FET and is led out through FET and acts as foot (421), which is connected with the output end of positive electrode (31).

5. The lithium secondary battery according to claim 1, characterized in that the positive electrode contains lithium-containing materials which can be intercalated or de-intercalated reversibly by lithium ions, such as lithium-cobalt oxide, lithium-nickel oxide, lithium-manganese oxide; the negative electrode contains carbon materials which can be intercalated or de-intercalated reversibly by lithium ions, such as natural graphite, artificial graphite, cork; the electrolyte is non-aqueous, solid or gel electrolytes.

6. The lithium secondary battery according to claim 1, characterized in that the circuit protective module is encased by a sealing material resistant to the corrosion of electrolyte so that the module is isolated from the electrolyte.

7. The lithium secondary battery according to claim 1, characterized in that the battery is in the shape of cylinder, cube or sheet.

* * * * *